United States Patent
Sfaradi et al.

(10) Patent No.: US 10,262,422 B2
(45) Date of Patent: Apr. 16, 2019

(54) CONTENT AWARE VISUAL IMAGE PATTERN MATCHING

(71) Applicant: SAMSUNG ELECTRONICS CO., LTD., Suwon-si, Gyeonggi-do (KR)

(72) Inventors: Roee Sfaradi, Nes Ziona (IL); Omry Sendik, Givatayim (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 55 days.

(21) Appl. No.: 15/647,483

(22) Filed: Jul. 12, 2017

(65) Prior Publication Data

US 2018/0018776 A1 Jan. 18, 2018

Related U.S. Application Data

(60) Provisional application No. 62/362,771, filed on Jul. 15, 2016.

(30) Foreign Application Priority Data

Jul. 15, 2016 (KR) ........................ 10-2016-0089984

(51) Int. Cl.
*G06K 9/00* (2006.01)
*H04N 7/18* (2006.01)
(Continued)

(52) U.S. Cl.
CPC .......... *G06T 7/246* (2017.01); *G06K 9/00771* (2013.01); *G06K 9/3216* (2013.01);
(Continued)

(58) Field of Classification Search
USPC ........ 382/100, 103, 106–107, 155–156, 162, 382/168, 173, 181, 194, 199, 209, 382/219–220, 232, 254–255, 276, 382/286–294, 305, 312, 167; 348/208.6, 348/51, 155
See application file for complete search history.

(56) References Cited

U.S. PATENT DOCUMENTS 9,396,385 B2 * 7/2016 Bentley ................. G11B 27/17
2006/0257042 A1 * 11/2006 Ofek ....................... G06T 5/005
382/255

(Continued)

OTHER PUBLICATIONS

Jean-Baptiste Note, et al., "Real-Time Video Pixel Matching," Departement d'informatique, 6 pages; [Date Accessed the Internet: Jul. 6, 2017; https://courses.cs.washington.edu/courses/cse591n/07wi/papers/pixelmatcher.pdf].

*Primary Examiner* — Seyed H Azarian
(74) *Attorney, Agent, or Firm* — F. Chau & Associates, LLC

(57) ABSTRACT

Exemplary embodiments of the invention as described herein generally provide for detecting the displacement of feature(s) within a visual image in cases where pattern matching fails due to the existence of aperture(s) caused for example by external condition(s) encountered in recording such an image over time. Technique(s) are disclosed for detecting the difference between displacement of a geometric feature of an object appearing within an image (e.g., an edge or smooth surface) that has an aperture and another feature (e.g., a corner) that does not since it is not symmetrically invariant.

20 Claims, 6 Drawing Sheets

Figure 10:
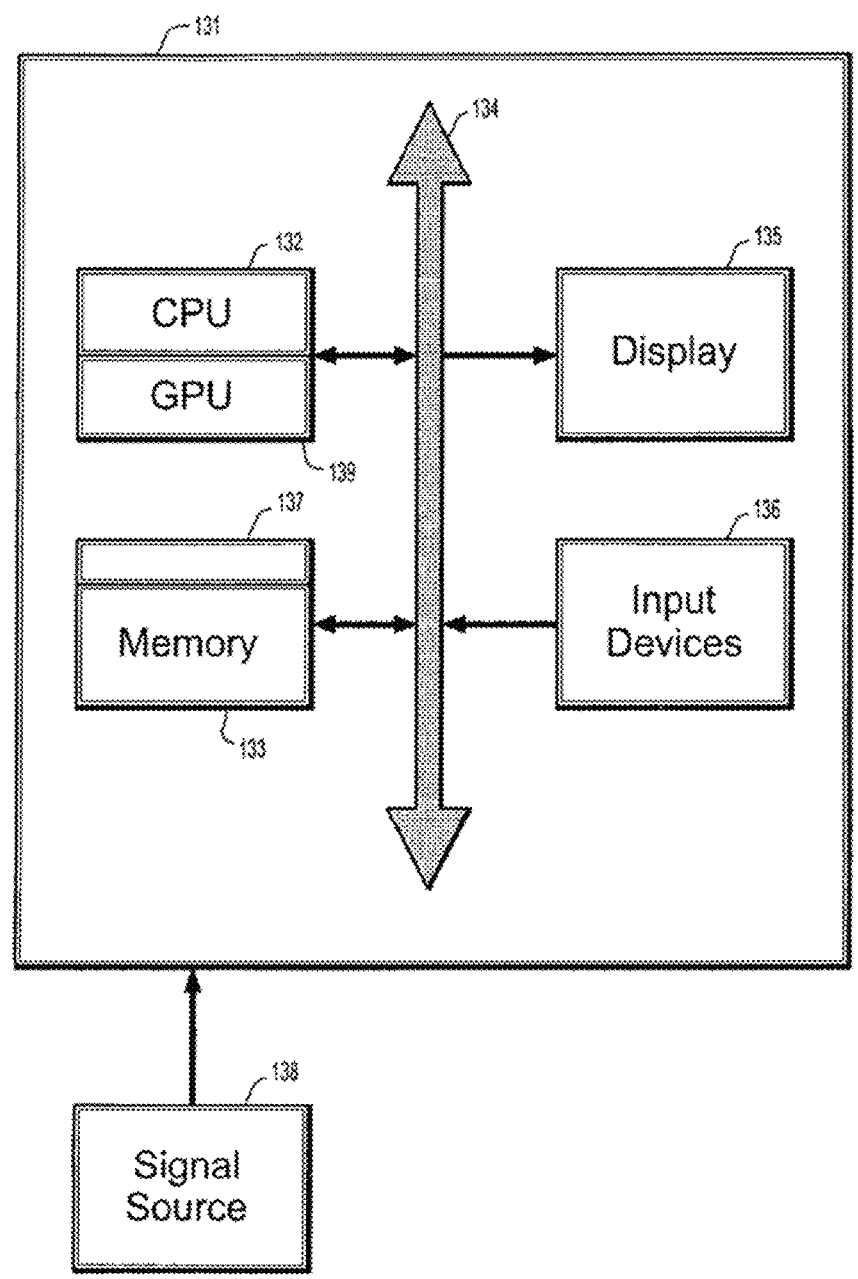

Motion Estimation using Edges, Corners or Textureless Regions

(51) Int. Cl.
    *G06T 7/246*    (2017.01)
    *G06K 9/32*     (2006.01)
    *H04N 5/14*     (2006.01)
    *G06T 5/00*     (2006.01)
    *G06K 9/62*     (2006.01)
(52) U.S. Cl.
    CPC ............ *G06K 9/6202* (2013.01); *G06T 5/006*
            (2013.01); *G06T 7/248* (2017.01); *H04N*
        *5/145* (2013.01); *G06T 2207/10016* (2013.01)

(56) References Cited

U.S. PATENT DOCUMENTS

| | | | |
|---|---|---|---|
| 2009/0096879 A1* | 4/2009 | Motomura | G03B 5/00 348/208.6 |
| 2011/0032340 A1* | 2/2011 | Redmann | H04N 13/363 348/51 |
| 2013/0322753 A1* | 12/2013 | Lim | G06T 5/001 382/167 |

* cited by examiner

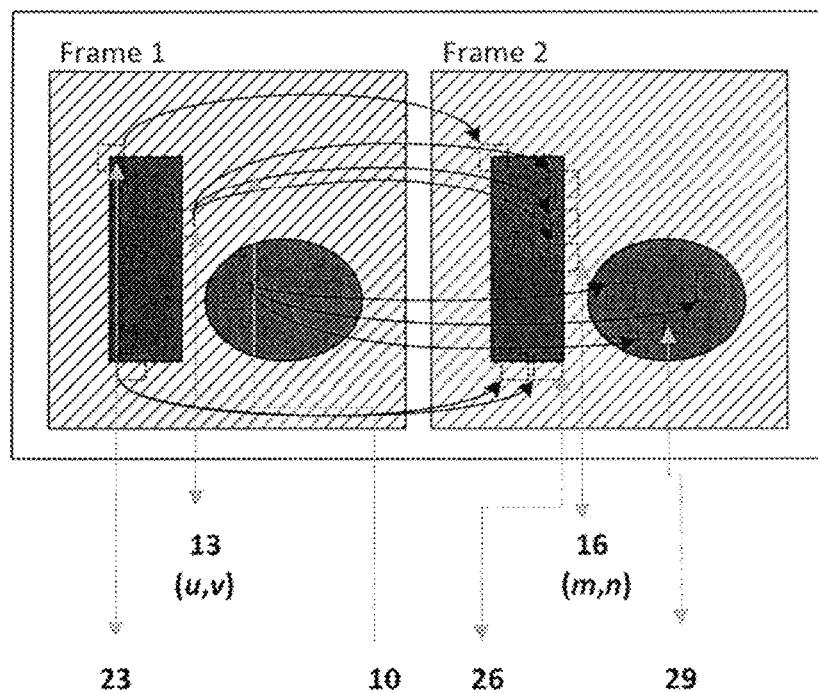
Figure 1 – Motion Estimation using Edges, Corners or Textureless Regions
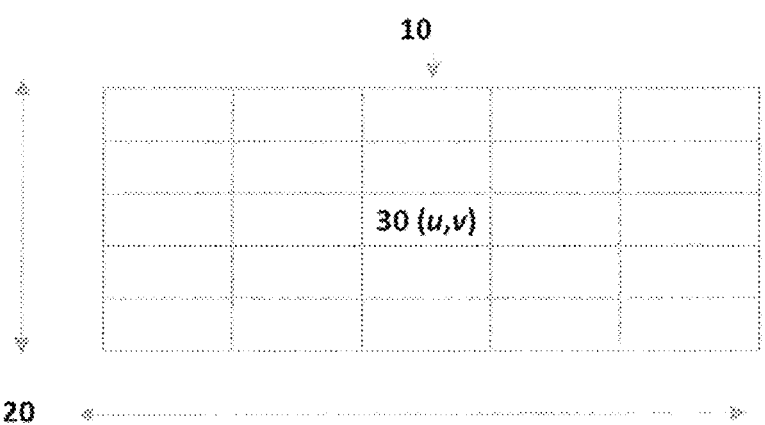
Figure 2

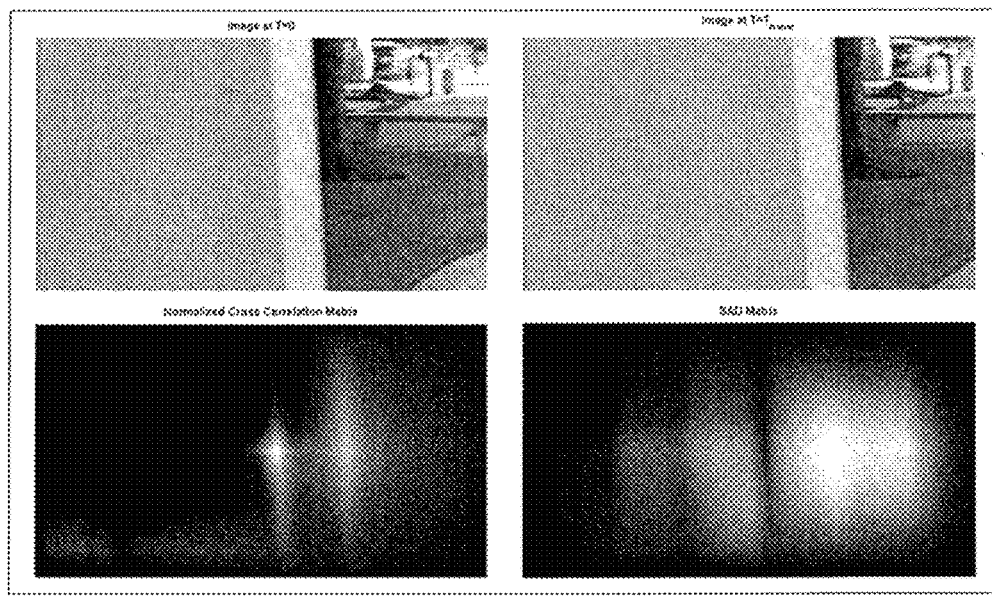
Figure 3 – A Normalized Cross Correlation matrix and SAD matrix between two input images
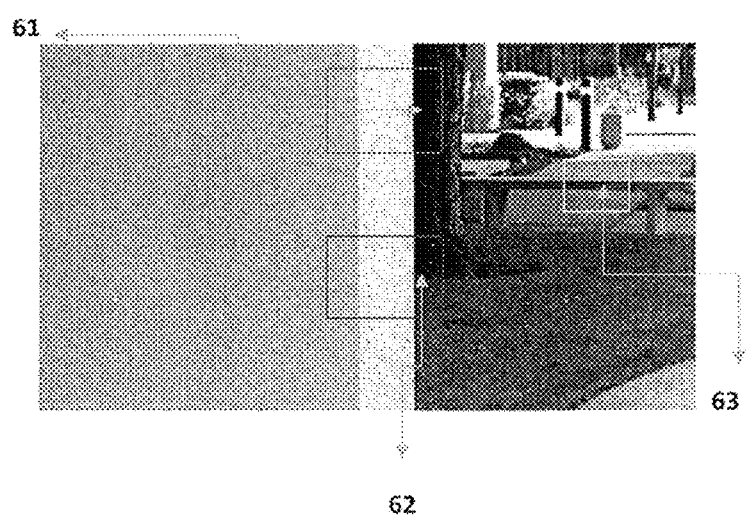
Figure 4 – Examples of regions prone to yield wrong ME results

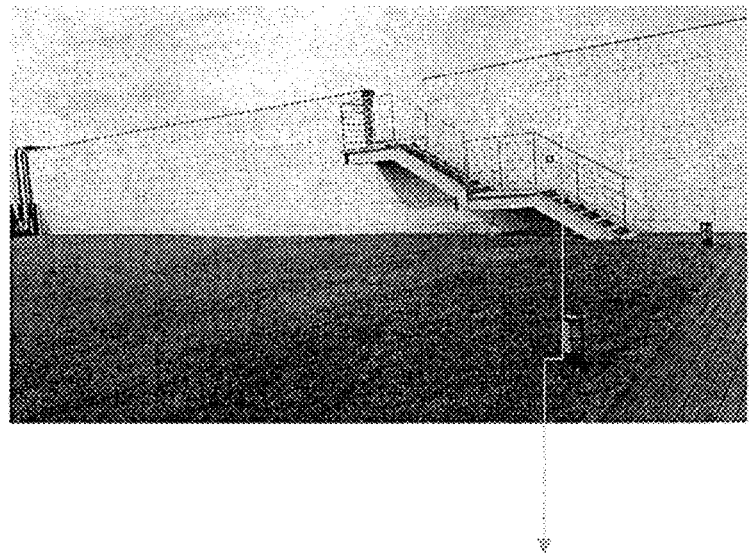
Figure 5 – Motion estimation source image 13
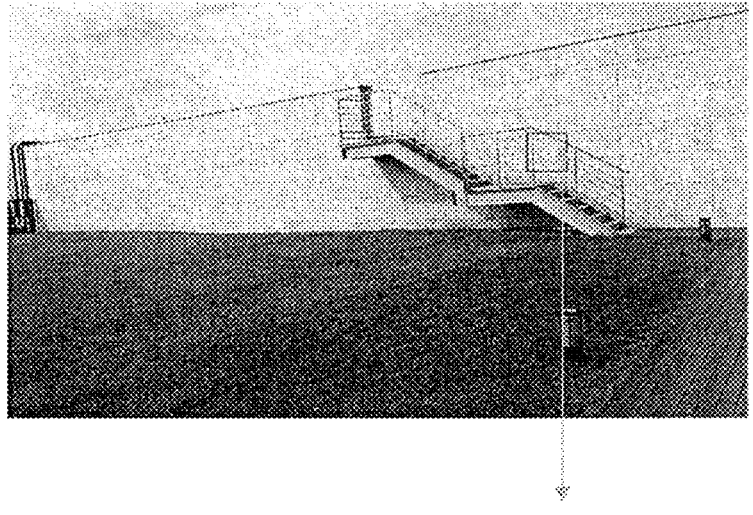
Figure 6 – Motion estimation target image 16

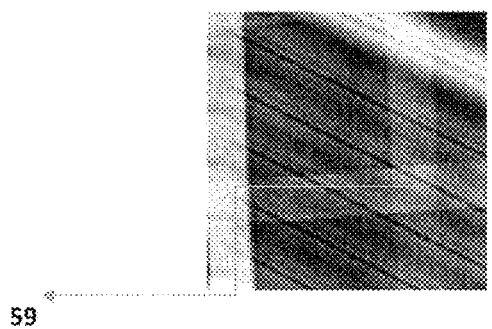
Figure 7 – Obtained distance MAP 50
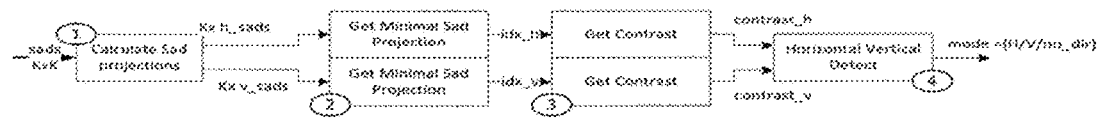
Figure 8 – Motion Estimation flowchart

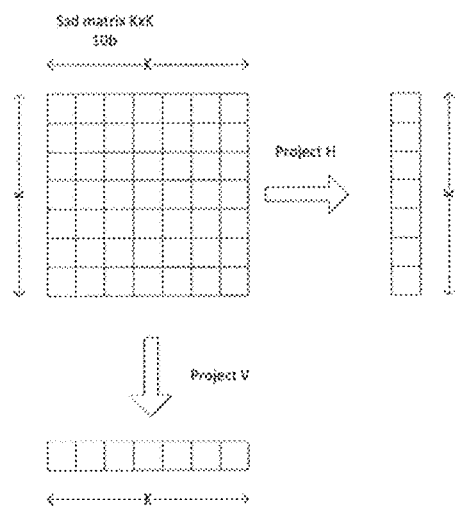
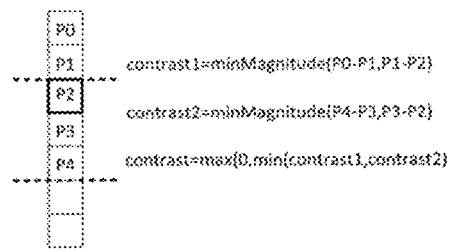
Figure 9 - Motion Estimation block diagram

CONTENT AWARE VISUAL IMAGE PATTERN MATCHING

CROSS-REFERENCE TO RELATED APPLICATIONS

This application claims the benefit of U.S. Provisional Patent Application No. 62/362,771, filed on Jul. 15, 2016, in the U.S. Patent and Trademark Office, and priority under 35 U.S.C. § 119(e) to Korean Patent Application No. 10-2016-0089984, filed on Jul. 15, 2016, in the Korean Intellectual Property Office, the disclosures of which are incorporated by reference herein in their entireties.

TECHNICAL FIELD

This disclosure is in the technical field of computer visual image processing.

DISCUSSION OF RELATED ART

Visual image correction techniques include the detection of aperture problems when conducting motion estimation for objects appearing in a visual image. Many motion estimation algorithms calculate motion vector(s) which define the motion of a visual image region from an original location in a source image to a new location in a target image without adequately detecting time-based movement in region(s) which contain both vertical and horizontal displacement information.

In using pattern matching algorithm(s) to track displacement of object(s) within a visual image (e.g., motion estimation, disparity, de-noising, etc.) a similarity measure is often used to detect change(s) within an image as viewed over succeeding time frame(s). However, such pattern matching techniques often fail to properly detect small changes within a region (or aperture) of a visual image that can occur due to typical variations in physical environment (e.g., noise, motion, misalignments, etc.) encountered in recording such an image over time.

These pattern matching approaches often fail when aperture problems are encountered where selected feature(s) of the target image block are geometrically indistinct from neighboring region(s) within the visual image, making it difficult for pattern matching scheme(s) to determine time-elapsed motion occurring within the correct source block for the image. An additional issue that such pattern matching techniques often fail to address is sensitivity to noise which can result in adding an unknown bias (random in nature) to the similarity measure(s) being used which can make it difficult to detect the correct source block due to the presence of external noise.

SUMMARY

Exemplary embodiments of the invention as described herein generally provide for detecting the displacement of feature(s) within a visual image in cases where pattern matching fails due to the existence of aperture(s) caused for example by external condition(s) encountered in recording such an image over time.

A method is disclosed for detecting the time-elapsed movement of a geometric feature of an object found within a visual image by:
  selecting a reference region defining a luminance value for an object found within a source image;
  selecting a new location within a target image also defining a luminance value for the object found within the source image;
  defining a motion estimation block for using a similarity measure to evaluate whether the luminance value within the target image corresponds to the luminance value for the reference region within the source image;
  forming a matrix containing an array of values from the motion estimation block that define the relative distance in each geometric dimension between the source image and any region within the target image having a luminance value that substantially corresponds to the luminance value for the reference region within the source image;
  combining motion estimation block value(s) within the matrix to define a distance map containing motion estimation vector(s) with distance index value(s) in each geometric dimension that project movement of the object from the reference region in the source image to a corresponding region in the target image;
  performing a contrast calculation using projected motion estimation vector distance index value(s) to detect whether time-elapsed movement of the object has occurred in a geometric dimension.

According to another exemplary aspect of the invention, technique(s) are disclosed for detecting the difference between displacement of a geometric feature of an object appearing within an image (e.g., an edge or smooth surface) that has an aperture and another feature (e.g., a corner) that does not since it is not symmetrically invariant.

According to another exemplary aspect of the invention, technique(s) are disclosed for providing information about dimension(s) of symmetry which can be used to increase effectiveness of noise reduction algorithms and/or increase accuracy for typical motion estimation algorithms by positively affecting the confidence level associated with such information along a symmetry axis (e.g., for MPEG compression/decompression) and for coping with extreme footage conditions as for example those described above.

According to a further exemplary aspect of the invention, there is provided a computer device containing software program instruction(s) executable by the computer to perform at least the foregoing operation(s) for detecting the displacement of object(s) within a visual image in cases where pattern matching fails due to the existence of an aperture.

BRIEF DESCRIPTION OF DRAWING(S)

FIGS. 1 & 2—Geometric diagrams of motion estimation using edges and/or corners and/or textureless regions of a visual image.

FIG. 3—Photographic illustrations of use of similarity measure(s) in conducting motion estimation for object(s) within a visual image.

FIG. 4—Photographic examples of visual image region(s) prone to yielding incorrect motion estimation results.

FIGS. 5 & 6—Photographic illustrations of a source image and a target image used for motion estimation.

FIG. 7—Photographic illustration of a Distance MAP obtained from motion estimation.

FIGS. 8 & 9—Schematic illustration(s) of a motion estimation flowchart and block diagram.

FIG. 10—Schematic diagram of a general-purpose computer configured to execute software instruction(s) programmed to process data for detecting the displacement of object(s) within a visual image in cases where pattern matching fails due to the existence of aperture(s).

DETAILED DESCRIPTION OF EXEMPLARY EMBODIMENT(S)

As shown with reference to FIGS. 1 & 2, an exemplary approach to handling motion estimation involves an attempt to find the location(s) of object(s) appearing in a visual image at an original location (e.g., FRAME "1") after time-elapsed movement to another location (e.g., FRAME "2") by using geometric region(s) of the image which will yield accurate motion estimation results. In the examples shown in these figures, using an internal textureless part of an ellipse 29 or alternately a horizontal and/or vertical edge 26 of a rectangle can be unsatisfactory since it can provide multiple directional vector(s) describing any potential time-based motion of such feature(s). As shown in these figures, using a corner 23 of a geometric feature can in some cases provide accurate results if no mis-detection occurs due to environmental conditions (e.g., noise, motion, misalignment(s), etc.) that can change in recording such an image over time.

According to an exemplary embodiment as shown with reference to FIGS. 1 & 2, an image region 20 can be defined as an arrayed section of a visual image 10 of dimension(s) $n_R$ row(s) by $n_C$ column(s) where the luminance of the $i^{th}$ image is defined by $I_i(u,v)$ surrounding a reference image location 30 geometrically identified by $(u,v)$. Detecting a new location $(m,n)$ within a target image 16 for luminance value(s) $I_{i+1}(m,n)$ substantially corresponding to original reference location $(u,v)$ within a source image 13 after any time-elapsed movement of object(s) it represents can involve use of a similarity measure to perform a registration-like operation such as Normalized Cross Correlation (NXCR) and/or Sum of Absolute Differences (SAD) which can include at least one or more of the following calculation(s) where $\mu$ is an estimated expectation value and $(r,c)$ are value(s) defining the numeric range(s) for performing the calculation:

$$NXCR_{m,n}(u, v) = \frac{\sum_{r,c}(I_{i+1}(m+r, n+c) - \mu_{i+1}(m, n))(I_i(u+r, v+c) - \mu_i(u, v))}{\sqrt{\sum_{r,c}\left(\frac{I_{i+1}(m+r, n+c) - }{\mu_{i+1}(m, n)}\right)^2 \sum_{r,c}(I_i(u+r, v+c) - \mu_i(u, v))^2}}$$

$$SAD_{m,n}(u, v) = \sum_{r,c} |I_{i+1}(m+r, n+c) - I_i(u+r, v+c)|$$

A result of calculating (SAD) and/or (NXCR) similarity measure(s) on two sequential visual image frames is shown for example in FIG. 3, where a search for local minimum luminance value(s) for (SAD) and/or local maximum luminance value(s) for (NXCR) can yield an accurate estimate of any relative displacement of object(s) caused by time-based motion occurring between recording of the two image(s). However, calculating similarity measure(s) using only smooth region(s) lacking sharply-defined border(s) existing in more than one geometric dimension may not always yield accurate motion estimation results; e.g., the image section(s) 61 & 62 may yield accurate results on horizontal motion without providing any useful data regarding vertical motion due to symmetry existing in the vertical axis (and vice versa for the section 63) as shown for example by the rectangular blocks in FIG. 4.

According to an exemplary embodiment, a Distance MAP can be obtained from a motion estimation block in detecting whether area(s) of a visual image containing aperture(s) have been evaluated. In estimating motion vector(s) geometrically defining any time-based movement of object(s) within a region of a visual image, a similarity measure (e.g., SAD, NXCR etc.) can be chosen and then for each region in the source image 13 the distance between the motion estimation block and all of the potentially corresponding block(s) in an (M×N) arrayed search area within the target image 16 can be evaluated. This can result in an (M×N) matrix containing values for the relative distance (in each geometric dimension) between respective corresponding source image and target image motion estimation block(s) 53 & 56 to define a Distance MAP 50 where a motion estimation vector 59 can be chosen to point to an absolute distance value between block(s), as shown for example in FIGS. 5 & 6 & 7.

According to an exemplary embodiment as shown for example in the flowchart and block diagram of FIGS. 8 & 9, a symmetry detection algorithm using above-described similarity measure(s) to construct a Distance MAP can provide a matrix that can be converted into a proposed pattern projection containing similarity measure(s) vector value(s) pointing from source to target image block(s) as defined in horizontal and/or vertical geometric dimension(s); as for example in projecting a (K×K) matrix into both "Project_H" and "Project_V" motion estimation vector(s) by combining distance value(s) for each respective row and column in the similarity measure(s) matrix as described below. Then an absolute distance from source image to target image can be determined using projected value(s) 1 contained in the similarity measure(s) ("Project_H" and "Project_V") vector(s) to serve as index(es) 2 for a contrast calculation 3 that can for example find the difference between projected absolute distance index ("idx_H" and "idx_V") value(s) in each dimension as "H_Contrast" and "V_Contrast"; which can be used to detect whether time-based displacement 4 has occurred along a vertical and/or horizontal edge such that for horizontal edge(s) large vertical contrast and small horizontal contrast value(s) exist (and vice versa for vertical edge(s)) when calculated for example according to the formula(s) shown below which can be expanded for symmetry detection in horizontal/vertical axe(s) as well as in other dimension(s).

As shown in the flowchart and block diagram of FIGS. 8 & 9, this symmetry detection algorithm can for example be comprised of the following steps. The first step is to calculate the similarity measure(s) projection into two (2) (Project_H) and (Project_V) vector(s) each of seven (7) value(s) obtained by summing each respective row and column in the (7×7) matrix. The second step is to find the minimum similarity measure(s) (idx_H and idx_V) index(es) in each (Project_Horiz) and (Project_Vert) vector. The third step is to obtain the maximum contrast value(s) (Horiz_Contrast) and (Vert_Contrast) from among two (2) cases for the contrast calculation (i) extreme minimal in which case the minimum index value is either P1 or P5 for the example shown in FIG. 9 and (ii) center minimal in which case the minimum index value lies in the range of P2 . . . P4 for the example shown in FIG. 9 and where a maximum magnitude function can be defined as:

$$f(x, y) = \begin{cases} \text{minax}(x, y) & x, y \geq 0 \\ 0x + y & \text{else} \\ \text{maxin}(x, y) & x, y \leq 0 \end{cases}$$

The fourth step is horizontal/vertical movement detection where vertical detect mode exists only if the following two (2) condition(s) are met where direction detection factor(s) used in the calculation are selected based upon threshold(s) designed to minimize noise.

Horiz_Contrast>Vert_Contrast+
direction_detect_factor*Vert_Contrast+direction_ detect_thresh Vert_Contrast≤direction_detect_thresh_orthogonal To calculate horizontal detect mode (Horiz_Contrast) and (Vert_Contrast) value(s) are exchanged for each other where horizontal detect mode and vertical detect mode cannot co-exist in the same output. Although this example is described with reference to symmetry detection in the horizontal and/or vertical axis it can be expanded for use in detecting symmetry with respect to any selected orientation or axis as desired.

While the above-described symmetry detection algorithm can assist with overcoming time-elapsed movement issue(s) that are related to the geometric symmetry of the object(s) involved, time-based displacement can also occur in cases in where external noise level(s) affect the similarity measure(s) used in determining whether the content of the source image substantially corresponds to the content of the target image. The above-described equation(s) for calculating Sum of Absolute Differences (SAD) at those previously defined image location(s) can be respectively expressed generally in the presence of noise level(s) $N_i(u,v)$ & $N_{i+1}(m,n)$ as:

$$SAD_{m,n}(u, v) = \sum_{r,c} |I_{i+1}(m + r, n + c) + n_{i+1}(m + r, n + c) - I_i(u + r, v + c) - n_i(u + r, v + c)|$$

If the predominant source of noise in the subject image is assumed to be photon shot noise then it can be statistically expressed in terms of a Poisson distribution that can be mathematically modeled as a Gaussian distribution with an expectation value and a standard deviation that varies according to the square root of the luminance intensity in the relevant signal range(s). This can be reduced to a Normal distribution when an absolute difference is calculated between the luminance of source and target image(s) respectively defined by $I_i(u,v)$ and $I_{i+1}(m,n)$ with a resulting expectation value μ that is equal to $$\mu = \frac{2}{\pi}.$$

σ where σ is the standard deviation of the Gaussian distribution and assuming substantially the same value(s) for $I_{i+1}$ and $I_i$ results in the following equation:

$$SAD_{m,n}(u, v) = \sum_{r,c} |n_{i+1}(m + r, n + c) - n_i(u + r, v + c)|$$

SAD-like similarity measure(s) may have difficulty with detecting time-elapsed movement occurring within "flat region(s)" of an image containing small difference(s) in direct current (DC) luminance signal intensity value(s) (for example due to a "shadow" in one region that doesn't exist in others) since a mathematical model of the noise may not exist in every image location and can cause the expectation value to be unknown and different than zero. An additional measurement can be added to address this issue and can be defined as:

$$SAD\_LPF_{m,n}(u, v) = \left| \sum_{r,c} I_{i+1}(m + r, n + c) - I_i(u + r, v + c) \right|$$

The addition of noise in this case also creates a Normal distribution but the expectation value can converge to zero instead of an unknown a dependent value. This similarity measure can be used in combination with other above-described similarity measures to effectively detect time-elapsed movement of corresponding image content in the presence of noise.

As shown with reference to FIG. 10, it is to be understood that the present inventive concept(s) include element(s) that can be implemented on at least one general-purpose computer 131; including a signal source 138 and/or processor(s) 132/139 and/or memory 133/137 and/or display 135 along with input/output device(s) 135/136 operatively coupled with each other via circuitry 134 which can be implemented on at least one integrated circuit and configured to operate by execution of software program instruction(s) to process data according to at least one or more exemplary embodiment(s) as described above. Thus, it is to be understood by one skilled in the art that these inventive concept(s) can be implemented using conventional computer hardware, software or a combination of both.

It will be understood by one skilled in the art that the present inventive concept(s) are only by way of example described and illustrated by reference to the foregoing description taken in conjunction with the accompanying drawings; and that the described feature(s), structure(s) and/or characteristic(s) may be combined and arranged and designed in different ways and that modification(s) and/or change(s) can be made to include device(s), system(s) and/or process(es) consistent with the inventive concept(s) as embodied in the following claims, which are to be interpreted as broadly as the law permits to cover the full scope of the invention, including all equivalents thereto.

What is claimed is:

1. A method for detecting time-elapsed movement of a geometric feature of an object found within a visual image comprising:

selecting a reference region defining a luminance value for at least a portion of an object found within a source image;

selecting at least one other region within a target image defining another luminance value for at least a portion of the object found within the source image;

defining a motion estimation block comprised of a plurality of image location(s) for use of a similarity measure in evaluating whether a luminance value for a selected region within the target image substantially corresponds to a luminance value for the reference region within the source image;

forming a matrix containing an array of value(s) from the motion estimation block that define a relative distance in each geometric dimension between the source image and any one or more selected region(s) within the target image having a luminance value that substantially corresponds to a luminance value for the reference region within the source image;

combining motion estimation block value(s) within the matrix to define at least one motion estimation vector with an absolute distance index value in each geometric dimension that is used to project movement of the object from the reference region in the source image to a corresponding region in the target image;

performing a contrast calculation using one or more projected motion estimation vector distance index value(s) to detect whether time-elapsed movement of the object has occurred in at least one geometric dimension; and performing a calculation for detecting a presence of noise affecting any time-elapsed movement of an object within the visual image, wherein an image region is comprised of an arrayed section of location(s) each having a luminance value in at least one geometric dimension.

2. The method of claim 1 wherein the similarity measure used in evaluating whether a luminance value for a selected region within the target image substantially corresponds to a luminance value for the reference region within the source image is comprised of one or more of:

a Normalized Cross Correlation (NXCR) operation; or a Sum of Absolute Differences (SAD) operation;

wherein a local minimum luminance value found using an (SAD) operation or a local maximum luminance value found using an (NXCR) operation yields an estimate of relative time-elapsed movement of at least one geometric feature of an object.

3. The method of claim 2 further comprised of performing one or more of the following similarity measure calculation(s) for evaluating whether a luminance value for a selected region within the target image substantially corresponds to a luminance value for the reference region within the source image:

$$NXCR_{m,n}(u, v) = \frac{\sum_{r,c}(I_{i+1}(m+r, n+c) - \mu_{i+1}(m, n))(I_i(u+r, v+c) - \mu_i(u, v))}{\sqrt{\sum_{r,c}(I_{i+1}(m+r, n+c) - \mu_{i+1}(m, n))^2 \sum_{r,c}(I_i(u+r, v+c) - \mu_i(u, v))^2}}$$

$$SAD_{m,n}(u, v) = \sum_{r,c} |I_{i+1}(m+r, n+c) - I_i(u+r, v+c)|$$

wherein $\mu$ is an estimated expectation value and $I_i(u,v)$ defines a luminance value surrounding a reference source image location geometrically identified by (u,v) and $I_{i+1}(m,n)$ defines another luminance value surrounding a target image location geometrically identified by (m,n) and (r,c) are value(s) defining numeric range(s) for performing the calculation.

4. The method of claim 2 wherein the (SAD) operation is statistically expressed as a Poisson distribution and mathematically modeled as a Gaussian distribution with an expectation value and a standard deviation that varies according to the square root of the luminance intensity to account for the presence of noise affecting time-elapsed movement of an object within the visual image.

5. The method of claim 4 wherein the (SAD) operation is further comprised of performing the following calculation for detecting the presence of noise affecting time-elapsed movement of an object within the visual image:

$$SAD_{m,n}(u, v) = \sum_{r,c} |I_{i+1}(m+r, n+c) + n_{i+1}(m+r, n+c) - I_i(u+r, v+c) - n_i(u+r, v+c)|$$

wherein $I_i(u,v)$ defines a luminance value surrounding a reference source image location geometrically identified by (u,v) and $I_{i+1}(m,n)$ defines another luminance value surrounding a target image location geometrically identified by (m,n) as experienced in the presence of noise level(s) $N_i(u,v)$ & $N_{i+1}(m,n)$ at the respective source and target image location(s) and (r,c) are value(s) defining numeric range(s) for performing the calculation.

6. The method of claim 4 wherein the (SAD) operation is reduced to a Normal distribution when an absolute difference is calculated between the luminance of source and target image location(s) with an expectation value $\mu$ that is equal to $$\mu = \frac{2}{\pi} \cdot \sigma$$

where $\sigma$ is the standard deviation of the Gaussian distribution.

7. The method of claim 6 wherein the (SAD) operation is further comprised of performing the following calculation for detecting the presence of noise affecting time-elapsed movement of an object within the visual image:

$$SAD_{m,n}(u, v) = \sum_{r,c} |n_{i+1}(m+r, n+c) - n_i(u+r, v+c)|$$

wherein substantially the same luminance value(s) are experienced in the presence of noise level(s) $N_i(u,v)$ & $N_{i+1}(m,n)$ at source and target image location(s) respectively geometrically identified by (u,v) and (m,n) and (r,c) are value(s) defining numeric range(s) for performing the calculation.

8. The method of claim 6 wherein the (SAD) operation is further comprised of performing the following calculation for detecting the presence of noise affecting time-elapsed movement of an object within the visual image:

$$SAD\_LPF_{m,n}(u, v) = \left| \sum_{r,c} I_{i+1}(m+r, n+c) - I_i(u+r, v+c) \right|$$

wherein $I_i(u,v)$ defines a luminance value surrounding a reference source image location geometrically identified by (u,v) and $I_{i+1}(m,n)$ defines another luminance value surrounding a target image location geometrically identified by (m,n) in the presence of noise level(s) experienced at the source and target image location(s) which cause the expectation value to converge to zero and (r,c) are value(s) defining numeric range(s) for performing the calculation.

9. The method of claim 1 carried out by performing a symmetry detection algorithm comprised of the following steps for detecting time-elapsed movement of a geometric feature of an object found within a visual image:
   summing each respective row and column in an arrayed matrix containing value(s) from the motion estimation block to calculate a motion estimation vector projection comprised of horizontal and vertical value(s);
   finding at least one minimum absolute distance index value for each projected vector;
   obtaining horizontal and vertical contrast value(s) by finding the maximum difference between projected minimum absolute distance index value(s) in each dimension according to the following function:

$$f(x, y) = \begin{cases} \max(x, y) & x, y \geq 0 \\ \theta x + y & \text{else} \\ \min(x, y) & x, y \leq 0 \end{cases}$$

detecting vertical movement of an object where vertical detection exists if the following condition(s) are met:

Horiz_Contrast>Vert_Contrast+
   direction_detect_factor*Vert_Contrast+direction_ detect_thresh Vert_Contrast≤direction_detect_thresh_orthogonal detecting horizontal movement of an object where horizontal detection exists if the following condition(s) are met:

Vert_Contrast>Horiz_Contrast+
   direction_detect_factor*Horiz_Contrast+direction_detect_threshold Horiz_Contrast≤direction_detect_threshold_orthogonal wherein direction detection factor and threshold value(s) are selected to minimize noise and horizontal detection mode and vertical detection mode cannot co-exist in the same output.

10. A visual image formed by a processor by carrying out a procedure comprised of steps for detecting time-elapsed movement of a geometric feature of an object found within a visual image, the steps comprising:
   selecting a reference region defining a luminance value for at least a portion of an object found within a source image;
   selecting at least one other region within a target image defining another luminance value for at least a portion of the object found within the source image;
   defining a motion estimation block comprised of a plurality of image location(s) for evaluating whether a luminance value for a selected region within the target image substantially corresponds to a luminance value for the reference region within the source image;
   performing a symmetry detection algorithm using at least one similarity measure to form a matrix containing an array of value(s) from the motion estimation block that define the relative distance in each geometric dimension between the source image and any one or more selected region(s) within the target image having a luminance value that substantially corresponds to a luminance value for the reference region within the source image;
   combining motion estimation block value(s) within the matrix to define a distance map containing at least one motion estimation vector with a minimum absolute distance index value in each geometric dimension that is used to project movement of the object from the reference region in the source image to a corresponding region in the target image;
   performing a contrast evaluation by calculating a maximum difference between projected motion estimation vector distance index value(s) to detect whether time-elapsed movement of the object has occurred in at least one geometric dimension; and
   performing a calculation for detecting a presence of noise affecting any time-elapsed movement of an object within the visual image,
   wherein an image region is comprised of an arrayed section of location(s) each having a luminance value in at least one geometric dimension.

11. The visual image of claim 10 wherein the similarity measure used in evaluating whether a luminance value for a selected region within the target image substantially corresponds to a luminance value for the reference region within the source image is comprised of one or more of:
   a Normalized Cross Correlation (NXCR) operation; or
   a Sum of Absolute Differences (SAD) operation;
      wherein a local minimum luminance value found using an (SAD) operation or a local maximum luminance value found using an (NXCR) operation yields an estimate of relative time-elapsed movement of at least one geometric feature of an object.

12. The visual image of claim 11 further comprised of performing one or more of the following similarity measure calculation(s) for evaluating whether a luminance value for a selected region within the target image substantially corresponds to a luminance value for the reference region within the source image:

$$NXCR_{m,n}(u, v) = \frac{\sum_{r,c} (I_{i+1}(m+r, n+c) - \mu_{i+1}(m, n))(I_i(u+r, v+c) - \mu_i(u, v))}{\sqrt{\sum_{r,c} (I_{i+1}(m+r, n+c) - \mu_{i+1}(m, n))^2 \sum_{r,c} (I_i(u+r, v+c) - \mu_i(u, v))^2}}$$

$$SAD_{m,n}(u, v) = \sum_{r,c} |I_{i+1}(m+r, n+c) - I_i(u+r, v+c)|$$

wherein $\mu$ is an estimated expectation value and $I_i(u,v)$ defines a luminance value surrounding a reference source image location geometrically identified by $(u,v)$ and $I_{i+1}(m,n)$ defines another luminance value surrounding a target image location geometrically identified by $(m,n)$ and $(r,c)$ are value(s) defining numeric range(s) for performing the calculation.

13. The visual image of claim 11 wherein the (SAD) operation is statistically expressed as a Poisson distribution and mathematically modeled as a Gaussian distribution with an expectation value and a standard deviation that varies according to the square root of the luminance intensity to account for the presence of noise affecting time-elapsed movement of an object within the visual image.

14. The visual image of claim 13 wherein the (SAD) operation is further comprised of performing the following calculation for detecting the presence of noise affecting time-elapsed movement of an object within the visual image:

$$SAD_{m,n}(u, v) = \sum_{r,c} |I_{i+1}(m + r, n + c) + n_{i+1}(m + r, n + c) - I_i(u + r, v + c) - n_i(u + r, v + c)|$$

wherein $I_i(u,v)$ defines a luminance value surrounding a reference source image location geometrically identified by $(u,v)$ and $I_{i+1}(m,n)$ defines another luminance value surrounding a target image location geometrically identified by $(m,n)$ as experienced in the presence of noise level(s) $N_i(u,v)$ & $N_{i+1}(m,n)$ at the respective source and target image location(s) and $(r,c)$ are value(s) defining numeric range(s) for performing the calculation.

15. The visual image of claim 13 wherein the (SAD) operation is reduced to a Normal distribution when an absolute difference is calculated between the luminance of source and target image location(s) with an expectation value $\mu$ that is equal to $\mu=2/\pi \cdot \sigma$ where $\sigma$ is the standard deviation of the Gaussian distribution.

16. The visual image of claim 15 wherein the (SAD) operation is further comprised of performing the following calculation for detecting the presence of noise affecting time-elapsed movement of an object within the visual image:

$$SAD_{m,n}(u, v) = \sum_{r,c} |n_{i+1}(m + r, n + c) - n_i(u + r, v + c)|$$

wherein substantially the same luminance value(s) are experienced in the presence of noise level(s) $N_i(u,v)$ & $N_{i+1}(m,n)$ at source and target image location(s) respectively geometrically identified by $(u,v)$ and $(m,n)$ and $(r,c)$ are value(s) defining numeric range(s) for performing the calculation.

17. The visual image of claim 15 wherein the (SAD) operation is further comprised of performing the following calculation for detecting the presence of noise affecting time-elapsed movement of an object within the visual image:

$$SAD\_LPF_{m,n}(u, v) = \left|\sum_{r,c} I_{i+1}(m + r, n + c) - I_i(u + r, v + c)\right|$$

wherein $I_i(u,v)$ defines a luminance value surrounding a reference source image location geometrically identified by $(u,v)$ and $I_{i+1}(m,n)$ defines another luminance value surrounding a target image location geometrically identified by $(m,n)$ in the presence of noise level(s) experienced at the source and target image location(s) which cause the expectation value to converge to zero and $(r,c)$ are value(s) defining numeric range(s) for performing the calculation.

18. The visual image of claim 10 wherein the symmetry detection algorithm is comprised of the following steps for detecting time-elapsed movement of a geometric feature of an object found within a visual image:

summing each respective row and column in an arrayed matrix containing value(s) from the motion estimation block to calculate a motion estimation vector projection comprised of horizontal and vertical value(s);

finding at least one minimum absolute distance index value for each projected vector;

obtaining horizontal and vertical contrast value(s) by finding the maximum difference between projected minimum absolute distance index value(s) in each dimension according to the following function:

$$f(x, y) = \begin{cases} \max(x, y) & x, y \geq 0 \\ \theta x + y & \text{else} \\ \min(x, y) & x, y \leq 0 \end{cases}$$

detecting vertical movement of an object where vertical detection exists if the following condition(s) are met:

Horiz_Contrast>Vert_Contrast+
 direction_detect_factor*Vert_Contrast+direction
 _detect_thresh Vert_Contrast≤direction_detect_thresh_orthogonal detecting horizontal movement of an object where horizontal detection exists if the following condition(s) are met:

Vert_Contrast>Horiz_Contrast+
 direction_detect_factor*Horiz_Contrast+direc-
 tion_detect_threshold Horiz_Contrast≤direction_detect_threshold_orthogo-
 nal wherein direction detection factor and threshold value(s) are selected to minimize noise and horizontal detection mode and vertical detection mode cannot co-exist in the same output.

19. A non-transitory computer readable medium configured to execute software instructions programmed to process data for carrying out a procedure comprised of the following steps for detecting time-elapsed movement of a geometric feature of an object found within a visual image:

selecting a reference region defining a luminance value for at least a portion of an object found within a source image;

selecting at least one other region within a target image defining another luminance value for at least a portion of the object found within the source image;

defining a motion estimation block comprised of a plurality of image location(s) for use of a similarity measure in evaluating whether a luminance value for a selected region within the target image substantially corresponds to a luminance value for the reference region within the source image;

forming a matrix containing an array of value(s) from the motion estimation block that define the relative distance in each geometric dimension between the source image and any one or more selected region(s) within the target image having a luminance value that substantially corresponds to a luminance value for the reference region within the source image;

combining motion estimation block value(s) within the matrix to define at least one motion estimation vector with an absolute distance index value in each geometric dimension that is used to project movement of the object from the reference region in the source image to a corresponding region in the target image;

performing a contrast calculation using one or more projected motion estimation vector distance index value(s) to detect whether time-elapsed movement of the object has occurred in at least one geometric dimension; and performing a calculation for detecting a presence of noise affecting any time-elapsed movement of an object within the visual image;

wherein an image region is comprised of an arrayed section of location(s) each having a luminance value defining an aperture in at least one geometric dimension.

20. The computer device of claim 19 wherein the similarity measure used in evaluating whether a luminance value for a selected region within the target image substantially corresponds to a luminance value for the reference region within the source image is comprised of one or more of:
a Normalized Cross Correlation (NXCR) operation; or
a Sum of Absolute Differences (SAD) operation;
wherein a local minimum luminance value found using an (SAD) operation or a local maximum luminance value found using an (NXCR) operation yields an estimate of relative time-elapsed movement of at least one geometric feature of an object.

* * * * *